Jan. 1, 1929.
F. INGERSOLL
1,697,427
FRYING PAN
Filed Dec. 18, 1926
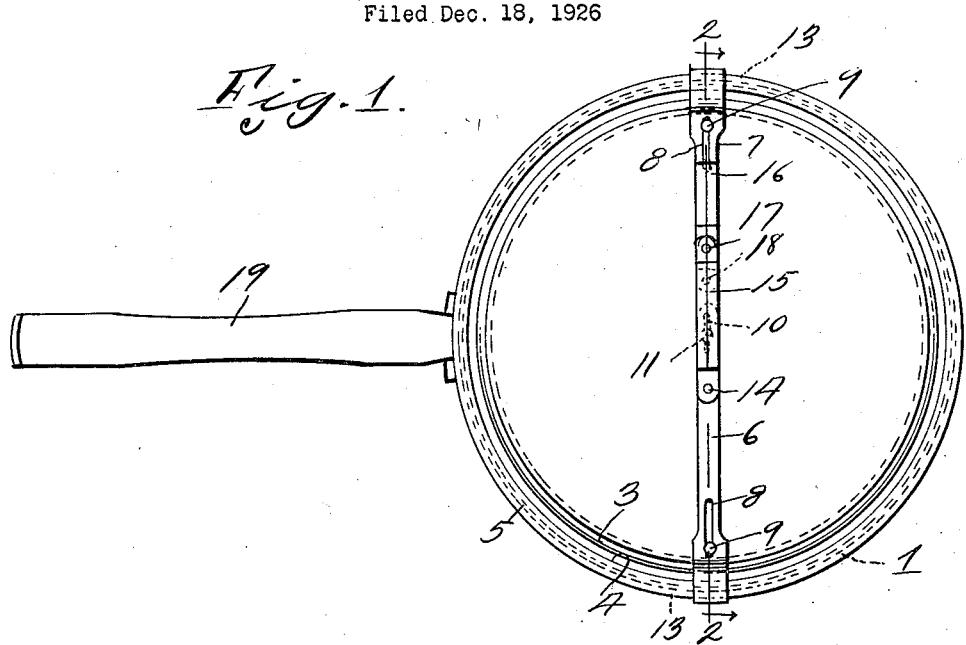
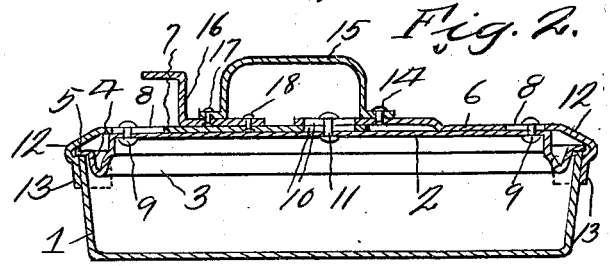
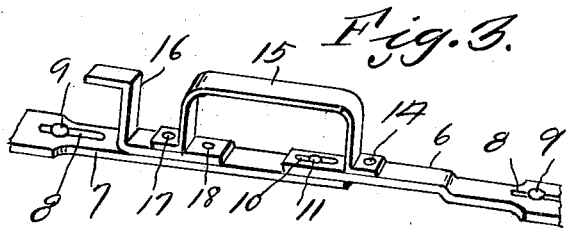
Inventor
F. Ingersoll
By James W. Martin
Attorney Patented Jan. 1, 1929.

1,697,427

UNITED STATES PATENT OFFICE.

FRED INGERSOLL, OF OMAHA, NEBRASKA.

FRYING PAN.

Application filed December 18, 1926. Serial No. 155,664.

The invention relates to frying pans, and has for its object to provide a device of this character with a cover, which cover is provided with attaching means whereby during a frying operation, the cover may be forced into close airtight engagement with the rim of the pan thereby allowing both sides of a piece of meat to be simultaneously cooked or browned, and at the same time the cover prevents the meat from losing its flavor which is a common difficulty experienced with cookers of this character at present constructed.

A further object is to provide the cover with arms slidably connected thereto, and having their inner ends overlapped and provided with longitudinally disposed slots through which a headed member carried by the cover extends, and the outer ends of the member with downwardly extending arcuately shaped jaws adapted to grip opposite sides of the body of the cooking device and lever means for forcing the slidable members together or apart and comprising a U-shaped member having its arm pivoted to one of the slidable members and its other arm pivoted to a handle member beyond the pivotal point of the handle member, and which handle member is pivoted to the other slidable member carried by the cover. The U-shaped member forms a handle member adapted to be grasped by the operator when placing the cover in position or removing the same.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of the pan showing the cover applied thereto.

Figure 2 is a vertical transverse sectional view through the pan taken on line 2—2 of Figure 1.

Figure 3 is a perspective view of the cover holding mechanism.

Figure 4 is a perspective view of one of the body engaging members.

Referring to the drawing the numeral 1 designates the body of the cooking device and 2 the cover. The cover 2 is provided with an annular downwardly extending bead 3, which reinforces the cover, adds stiffness thereto, and which bead has its upwardly extending flange 4 provided with a horizontally disposed flange 5, which engages the upper edge of the body 1 of the device, and when the cover is secured to the body a substantially airtight engagement of the flange 5 is insured for preventing escape of flavor of the meat that is being cooked, and at the same time insures a cooking of both sides of the piece of meat.

Slidably mounted on the upper side of the cover 2 are arms 6 and 7, which arms adjacent their outer ends are provided with elongated slots 8, through which the headed members 9 extend, and on which headed members the members 6 and 7 are slidably mounted. The inner ends of the members 6 and 7 are overlapped, and provided with registering slots 10 through which the headed member 11 extends. It will be seen the members 6 and 7 are radially disposed in relation to the cover, and at the same time are in substantial alinement with each other. The outer ends of the members 6 and 7 incline outwardly and downwardly as shown at 12, and are provided with arcuately shaped jaws 13, which jaws engage the opposite sides of the body member 1, and when the parts are in position shown in Figure 2 securely hold and attach the cover 2 to the body 1. Pivotally connected at 14 to the arms 6 adjacent its inner end is an upwardly extending inverted handle member 15, which handle member not only forms means adapted to be grasped by the operator for placing the cover as a whole in position but for removing the same, and also as a link connection between the member 6 and the lever 16, to which it is pivotally connected at 17, and which lever is in turn pivotally connected at 18 to the arm 7 in a position whereby when the lever 16 is moved into registration with the arm 7, the arms 6 and 7 will be forced inwardly towards each other for forcing the gripping jaws 13 into close binding engagement with opposite sides of the body 1, or when moved out of registration said jaws will be forced outwardly in relation to each other through outward movement of the arms 6 and 7, therefore it will be seen a positive gripping of the body is insured and at the same time a cover attaching structure provided which is positive in its operation, the parts reduced to a minimum, and one which may be cheaply manufactured and sold.

The invention having been set forth what is claimed as new and useful is:—

The combination with a cooking utensil body, a cover carried by said body, of means for attaching said cover to said body, said means comprising arms slidably connected to the upper side of the cover, the inner ends of said arms being overlapped and provided with elongated slots, a headed member carried by the cover and extending through said slots, headed members carried by the cover adjacent its opposite sides and extending through elongated slots in the arms, an inverted U-shaped member pivotally connected to one of the arms adjacent its inner end, a handle member pivotally connected to the other arm, said U-shaped member being pivotally connected to the handle member, arcuately shaped gripping jaws carried by the outer ends of the arms and cooperating with opposite sides of the body member, said handle member and U-shaped member forming means whereby said arms may be moved outwardly in relation to each other or inwardly in relation to each other.

In testimony whereof I hereunto affix my signature.

FRED INGERSOLL.